(12) United States Patent
Dukes et al.

(10) Patent No.: US 8,048,201 B2
(45) Date of Patent: Nov. 1, 2011

(54) OXYGEN SCAVENGER AND A METHOD FOR SCAVENGING OXYGEN

(75) Inventors: Marcus Dukes, Jackson, MS (US); John Hart, Florence, MS (US)

(73) Assignee: Desiccare, Inc, Pomona, CA (US)

( * ) Notice: Subject to any disclaimer, the term of this patent is extended or adjusted under 35 U.S.C. 154(b) by 302 days.

(21) Appl. No.: 12/412,329

(22) Filed: Mar. 26, 2009

(65) Prior Publication Data

US 2010/0242725 A1 Sep. 30, 2010

(51) Int. Cl.
*B01J 20/02* (2006.01)

(52) U.S. Cl. .................. 95/138; 423/219; 252/188.28

(58) Field of Classification Search .................. 96/148; 95/117, 138; 423/219; 252/188.28; 502/400
See application file for complete search history.

(56) References Cited

U.S. PATENT DOCUMENTS

| | | | |
|---|---|---|---|
| 4,230,595 A | 10/1980 | Yamaji et al. |
| 4,265,675 A | 5/1981 | Tsao et al. |
| 4,421,533 A | 12/1983 | Nishino et al. |
| 4,588,561 A | 5/1986 | Aswell et al. |
| 4,652,435 A | 3/1987 | Natsuume et al. |
| 4,705,876 A | 11/1987 | Ivanov et al. |
| 5,143,763 A | 9/1992 | Yamada et al. |
| 5,262,375 A | 11/1993 | McKedy |
| 5,274,024 A | 12/1993 | Koyama et al. |
| 5,332,590 A | 7/1994 | McKedy |
| 5,750,037 A | 5/1998 | Bizot et al. |
| 5,839,593 A | 11/1998 | McKedy |
| 5,928,560 A | 7/1999 | DelDuca et al. |
| 5,989,440 A | 11/1999 | Shimura et al. |
| 6,248,690 B1 | 6/2001 | McKedy |
| 6,306,201 B1 | 10/2001 | Makino |
| 6,315,921 B1 | 11/2001 | DelDuca et al. |
| 6,395,195 B1 | 5/2002 | Evans et al. |
| 6,436,872 B2 | 8/2002 | McKedy |
| 6,508,955 B1 | 1/2003 | DelDuca et al. |
| 6,558,571 B1 | 5/2003 | Powers |
| 6,616,861 B1 | 9/2003 | Evans et al. |
| 6,666,988 B2 | 12/2003 | DelDuca et al. |
| 6,667,273 B1 | 12/2003 | Cullen et al. |
| 6,843,040 B2 | 1/2005 | Eto et al. |
| 6,899,822 B2 | 5/2005 | McKedy |
| 6,921,026 B2 | 7/2005 | Saari et al. |
| 6,926,846 B1 | 8/2005 | DelDuca et al. |
| 7,125,498 B2 | 10/2006 | McKedy |
| 7,147,799 B2 | 12/2006 | DelDuca et al. |
| 7,435,704 B2 | 10/2008 | Hekal |
| 2005/0072958 A1 | 4/2005 | Powers |

*Primary Examiner* — Frank Lawrence, Jr.
(74) *Attorney, Agent, or Firm* — Christie, Parker & Hale, LLP

(57) ABSTRACT

An oxygen scavenger is provided. An oxygen scavenger comprises iron, malic acid, and a wicking agent. A method for scavenging oxygen from an enclosed container comprises providing an oxygen scavenger compound comprising iron, malic acid, and a wicking agent, sealing the composition in an oxygen permeable, water impermeable container, and activating the composition by injecting water into the container.

20 Claims, No Drawings

OXYGEN SCAVENGER AND A METHOD FOR SCAVENGING OXYGEN

FIELD OF THE INVENTION

The present invention relates to oxygen scavengers and methods of removing oxygen from an enclosed container.

BACKGROUND OF THE INVENTION

Oxygen scavengers, or oxygen absorbers, are used to quickly absorb oxygen from a contained volume of air. Oxygen scavengers can be used in many applications, including in food packaging. By quickly removing oxygen from food packaging, the shelf life of perishable goods is improved. When used in food packaging, oxygen scavengers prevent food color change and slow the growth of bacteria.

Oxygen scavengers often operate by reacting an oxygen reducing agent with oxygen. One common oxygen reducing agent is iron. The reaction of iron and oxygen may be represented by the following formula:

$$4Fe + O_2 \rightarrow 2Fe_2O_3$$

The unaided oxidation of iron is rather slow, however. Thus, it is advantageous to include a catalyst to speed the reaction. One such catalyst is water. In the presence of water, the reaction of iron and oxygen may be represented by the following formulae:

$$2Fe + O_2 + 2H_2O \rightarrow 2Fe(OH)_2$$

$$4Fe(OH)_2 + O_2 \rightarrow 2H_2O + 2Fe_2O_3 \cdot H_2O$$

Another such catalyst is an acid. A lowered pH improves the speed of oxidation. However, some acid catalyzed oxygen scavengers produce hydrogen gas and other gasses as a byproduct of oxygen absorption. The production of gas is undesirable in food packaging, as it tends to cause packaging to bloat.

SUMMARY OF THE INVENTION

An embodiment of the present invention is directed to an oxygen scavenging composition comprising iron, malic acid, and a wicking agent which operates without producing gas.

Another embodiment of the present invention is directed to an oxygen scavenging composition comprising iron in amount by weight of 40% to 90%, malic acid in an amount by weight of 10% to 40%, and a wicking agent in amount by weight of 10% to 40%.

Yet another embodiment of the present invention is directed to an oxygen scavenging composition comprising iron in amount by weight of 50% to 60%, malic acid in an amount by weight of 15% to 25%, and a wicking agent in amount by weight of 20% to 30%.

Another embodiment of the present invention is directed to an oxygen scavenging composition comprising sponge iron, malic acid, and cellulose.

An embodiment of the present invention is directed to a method of absorbing oxygen by providing an oxygen scavenging composition comprising iron, malic acid, and a wicking agent; sealing the oxygen scavenging composition in an oxygen permeable, water impermeable container; and activating the oxygen scavenging composition by adding water to the container.

DETAILED DESCRIPTION OF THE INVENTION

Generally, an oxygen scavenger comprises an oxidizable material, an acid, and a wicking agent.

An oxidizable material may be any suitable oxidizable material such as ascorbic acid, salts of ascorbic acid, or an oxidizable metal. Examples of oxidizable metals that can be used include iron, zinc, copper, and tin. Examples of suitable types of iron include sponge grade iron, electrolytically reduced iron, hydrogen reduced iron, and carbonyl reduced iron. A combination of two or more oxidizable materials may be used. In some embodiments of the invention, sponge grade iron is used. Sponge grade iron is porous and has a high surface area. Increased surface area makes the iron more reactive, speeding the oxidation process. Any size Mesh sponge grade iron can be used. In other embodiments, 100 to 325 Mesh sponge grade iron can be used.

In some embodiments of the invention, oxidizable material may be present in an amount by weight of between about 40% and about 90%. In other embodiments of the invention, oxidizable material may be present in an amount by weight of between about 50% and about 60%.

An acid is present in the oxygen scavenger. When water is added to an oxygen scavenger, the acid creates an acidic environment for the oxygen scavenger, speeding oxidation and thus oxygen consumption. In some embodiments, the pH of the oxygen scavenger, when wet, is between about 2 and about 3. Examples of acids for use in the oxygen scavenger are malic acid, tartaric acid, acetic acid, potassium bitartrate, alum, benzoic acid, and citric acid. In some embodiments of the invention, the acid is malic acid. In some embodiments of the invention, acid is present in an amount by weight of between about 10% and about 40%. In other embodiments of the invention, acid is present in an amount by weight of between about 15% and about 25%.

A wicking agent is also present in the oxygen scavenger. The wicking agent may increase the gas and liquid permeability of the mixture, allowing more iron to be oxidized, increasing the efficiency of the oxygen scavenger. The wicking agent may also prevent the formation of a layer of iron oxide on the exterior of the iron, which might otherwise slow further oxidation. The wicking agent may also serve to absorb water. In addition to the wicking agent, a separate water absorber may also be used. Examples of a wicking agent for use in the oxygen scavenger are cellulose, food safe polymers, silica gels, soluble fiber, starches, and vegetable gums. Examples of a water absorber include silicates, gelling agents, molecular sieves, zeolites, carbon, clay, and superadsorbent polymers. In some embodiments of the invention, the wicking agent is cellulose.

In some embodiments of the present invention, a wicking agent may be present in an amount by weight of between about 10% to about 40%. In other embodiments of the present invention, a wicking agent may be present in an amount by weight of between about 20% to about 30%.

Various salts may be added to the oxygen scavenger to speed the reaction of iron and oxygen. The salt "pits" the surface of the iron, increasing the surface area of the iron, speeding the oxidation reaction. Preferably, the salt additive does not substantially affect the pH of the oxygen scavenger. Examples of suitable salts include chloride salts, such as NaCl, $CaCl_2$, or $MgCl_2$.

To make the oxygen scavenger, iron, malic acid, and cellulose are mixed thoroughly in a dry mixer. The oxygen scavenger may then be placed and sealed in an oxygen permeable, water impermeable container. The container can be in various shapes and sizes. Examples of suitable containers include packets, canisters, capsules, and the like. Suitable oxygen permeable, water impermeable materials include PET films and Tyvek (available from E.I. du Pont de Nemours and Co.). The container should be oxygen permeable so that it can operate to absorb oxygen from the air and water impermeable so that water does not leak out of the container. As used herein, in some embodiments, water impermeable could also mean substantially water impermeable.

To activate the oxygen scavenger, water is injected into the oxygen permeable, water impermeable container containing the oxygen scavenger. Any solution containing water may be used to activate the scavenger, as long as the solution does not substantially affect the pH of the scavenger. For example, vinegar or deionized water can be used. In some embodiments of the present invention, deionized water could be injected into the container using a syringe.

The amount of oxygen scavenger composition needed to absorb oxygen varies proportionally with the amount of oxygen that needs to be absorbed. For a more oxygen rich environment, more oxygen scavenger composition is needed to absorb the greater levels of oxygen.

EXAMPLE 1

An oxygen scavenger mixture was created by combining 325 Mesh sponge grade iron powder in an amount by weight of 52%, malic acid in an amount by weight of 24%, and SolkaFloc 40FCC (a cellulose available from the International Fiber Corporation; North Tonawanda, N.Y.) in an amount by weight of 24%. The ingredients were mixed using a dry mixer until thoroughly mixed.

EXAMPLE 2

Four 5 gram samples of the oxygen scavenger mixture of Example 1 were placed into separate Tyvek pouches and sealed. Then, 1.75 mL of deionized water was injected into each of the pouches. The pouches were placed in sealed containers with air at 34° F., containing 21.2% oxygen. Each of the samples were tested for residual oxygen percentage after 1, 24, 48, and 72 hours. The oxygen content of the sealed containers were measured using an oxygen analyzer and reported in Table 1.

TABLE 1

| | Residual % Oxygen | | | | |
|---|---|---|---|---|---|
| | Original | 1 Hr | 24 Hr | 48 Hr | 72 Hr |
| Test 1 | 21.2 | 14.2 | 6.0 | 4.9 | 1.3 |
| Test 2 | 21.2 | 11.0 | 3.0 | 3.8 | 1.4 |
| Test 3 | 21.2 | 13.9 | 6.5 | 5.5 | 1.3 |
| Test 4 | 21.2 | 12.5 | 3.5 | 2.2 | 1.5 |
| Average | 21.2 | 12.9 | 4.8 | 4.1 | 1.4 |

The results show that the activated oxygen scavenger quickly absorbed oxygen from the sealed container, and within 72 hours had removed virtually all of the oxygen from the sealed container.

EXAMPLE 3

Four 24 gram samples of the oxygen scavenger mixture of Example 1 were placed into separate Tyvek pouches and sealed. Then, 8.4 mL of deionized water was injected into each of the pouches. The pouches were placed in sealed containers with air at 34° F., containing 21.2% oxygen. Each of the samples were tested to determine the amount of oxygen consumed after 1, 24, 48, and 72 hours. The oxygen contents of the sealed containers were measured using an oxygen analyzer and reported in Table 2

TABLE 2

| | CCs of Oxygen Consumed | | | |
|---|---|---|---|---|
| | 1 Hr | 24 Hr | 48 Hr | 72 Hr |
| Test 1 | 191 | 603 | 632 | 647 |
| Test 2 | 177 | 591 | 621 | 650 |
| Test 3 | 232 | 593 | 622 | 666 |
| Average | 200 | 596 | 625 | 654 |

The results show that that the activated oxygen scavenger quickly absorbed oxygen from the sealed container, and at 72 hours, was still effectively absorbing oxygen.

When the oxygen scavenger was activated and placed in a sealed container, it surprisingly appeared to pull a vacuum. This indicates that no substantial amount of gas, such as hydrogen, is produced as a byproduct of the oxygen scavenger.

While the present invention has been illustrated and described with reference to certain exemplary embodiments, those of ordinary skill in the art would appreciate that various modifications and changes can be made to the described embodiments without departing from the spirit and scope of the present invention, as defined in the following claims.

What is claimed is:

1. An oxygen scavenging composition on a dry basis consisting essentially of iron, malic acid, and a wicking agent.

2. The oxygen scavenging composition of claim 1, wherein the iron is sponge grade iron.

3. The oxygen scavenging composition of claim 1, wherein the iron is present in an amount by weight of about 40% to about 90%, the malic acid is present in an amount by weight of about 10% to about 40%, and the wicking agent is present in an amount by weight of about 10% to about 40%.

4. The oxygen scavenging composition of claim 1, wherein the iron is present in an amount by weight of about 50% to about 60%, the malic acid is present in an amount by weight of about 15% to about 25%, and the wicking agent is present in an amount by weight of about 20% to about 30%.

5. An activated oxygen scavenging composition, comprising the oxygen scavenging composition of claim 1 and water.

6. The activated oxygen scavenging composition of claim 5, wherein the activated oxygen scavenging composition has a pH of between about 2 and about 3.

7. The oxygen scavenging composition of claim 1, wherein the wicking agent serves as a water absorber.

8. The oxygen scavenging composition of claim 1, further comprising a separate water absorber.

9. The oxygen scavenging composition of claim 1, wherein the wicking agent is selected from the group consisting of cellulose, food safe polymers, and silica gel.

10. The oxygen scavenging composition of claim 1, wherein the wicking agent is cellulose.

11. A method of removing oxygen from an enclosed container without producing gas comprising: providing an oxygen scavenging composition comprising iron, malic acid, and a wicking agent; sealing the oxygen scavenging composition in an oxygen permeable, water impermeable container; and activating the oxygen scavenging composition by injecting a solution containing water into the oxygen permeable, water impermeable container containing the oxygen scavenging composition, wherein substantially no gas is produced.

12. The method of claim 11, wherein the oxygen scavenging composition comprises iron in an amount by weight of about 40% to about 90%, malic acid in an amount by weight of about 10% to about 40%, and wicking agent in an amount by weight of about 10% to about 40%.

13. The method of claim 11, wherein the oxygen scavenging composition comprises iron in an amount by weight of about 50% to about 60%, malic acid in an amount by weight of about 15% to about 25%, and wicking agent in an amount by weight of about 20% to about 30%.

14. The method of claim 11, wherein the wicking agent is selected from the group consisting of cellulose, food safe polymers, and silica gel.

15. The method of claim 11, wherein the wicking agent is cellulose.

16. The method of claim 11, wherein the iron is sponge grade iron.

17. An oxygen scavenging composition on a dry basis consisting essentially of iron, malic acid, a wicking agent, and a salt, wherein the salt does not substantially affect the pH of the composition.

18. The oxygen scavenging composition of claim 17, wherein the iron is present in an amount by weight of about 50% to about 60%, the malic acid is present in an amount by weight of about 15% to about 25%, and the wicking agent is present in an amount by weight of about 20% to about 30%.

19. The oxygen scavenging composition of claim 17, wherein the salt is a chloride salt.

20. The oxygen scavenging composition of claim 17, wherein the wicking agent is cellulose and the iron is sponge grade iron.

* * * * *